(12) United States Patent
Wu et al.

(10) Patent No.: US 9,977,471 B2
(45) Date of Patent: May 22, 2018

(54) HINGE STRUCTURE AND ELECTRONIC DEVICE

(71) Applicant: PEGATRON CORPORATION, Taipei (TW)

(72) Inventors: Hung-Yun Wu, Taipei (TW);
Shyh-Heh Hwang, Taipei (TW);
Ho-Ching Huang, Taipei (TW);
Hui-Chen Wang, Taipei (TW); I-Tien Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days. days.

(21) Appl. No.: 15/598,955

(22) Filed: May 18, 2017

(65) Prior Publication Data

US 2018/0059737 A1    Mar. 1, 2018

(30) Foreign Application Priority Data

Aug. 26, 2016  (TW) .............................. 105127372 A

(51) Int. Cl.
| | |
|---|---|
| *H05K 7/00* | (2006.01) |
| *H05K 5/00* | (2006.01) |
| *G06F 1/16* | (2006.01) |
| *E05D 3/02* | (2006.01) |
| *E05D 5/06* | (2006.01) |
| *E05D 11/08* | (2006.01) |

(52) U.S. Cl.
CPC ............ *G06F 1/1681* (2013.01); *E05D 3/02* (2013.01); *E05D 5/06* (2013.01); *E05D 11/084* (2013.01); *G06F 1/1632* (2013.01); *E05Y 2900/606* (2013.01)

(58) Field of Classification Search
CPC ........................................................ G06F 1/16
USPC ..................................................... 361/679.21
See application file for complete search history.

(56) References Cited

U.S. PATENT DOCUMENTS

2011/0297566 A1* 12/2011 Gallagher ............ F16M 11/105
  206/320
2016/0048176 A1*  2/2016 Saito ..................... G06F 1/1681
  361/679.27

FOREIGN PATENT DOCUMENTS

| CN | 101684837 | 10/2012 |
|---|---|---|
| CN | 204061529 | 12/2014 |
| TW | 357288 | 5/1999 |
| TW | 200826808 | 6/2008 |
| TW | M492379 | 12/2014 |

* cited by examiner

*Primary Examiner* — Jerry Wu
(74) *Attorney, Agent, or Firm* — J.C. Patents

(57) ABSTRACT

A hinge structure includes a shaft, a first locking member, a second locking member, a third locking member and an elastic element. The first locking member, the second locking member and the third locking member are all disposed on the shaft, wherein the first locking member, the second locking member and the third locking member rotate with the shaft as an axis. The elastic element is sleeved on the shaft, wherein a first side edge of the elastic element leans against the second locking member, and a second side edge of the elastic element leans against the third locking member to provide an elastic force between the second locking member and the third locking member, thereby maintaining or restoring a pivoting angle of the second locking member and the third locking member with respect to the axis.

8 Claims, 4 Drawing Sheets

HINGE STRUCTURE AND ELECTRONIC DEVICE

CROSS-REFERENCE TO RELATED APPLICATION

This application claims the priority benefit of Taiwan application serial no. 105127372, filed on Aug. 26, 2016. The entirety of the above-mentioned patent application is hereby incorporated by reference herein and made a part of this specification.

BACKGROUND

Technology Field

The invention relates to a hinge structure and an electronic device. More particularly, the invention relates to a hinge structure capable of being simultaneously locked on three components and an electronic device using the hinge structure.

Description of Related Art

Generally, a tablet computer and a base are combined as a notebook computer mainly by coupling the base to a docket station through a hinge. In case another device, for example, a back plate, is needed, another hinge is required to couple the back plate and the docket station. That is, such type of notebook computer requires at least two hinges to couple the base, the docket station and the back plate. The notebook computer has to increase an accommodation space in order to accommodate another hinge, and in this way, the volume and thickness of the notebook computer will also be increased.

SUMMARY

The invention provides a hinge structure capable of being simultaneously locked on three components.

The invention further provides an electronic device using the aforementioned hinge structure, which can effectively save disposition spaces of components.

A hinge structure including a shaft, a first locking member, a second locking member, a third locking member and an elastic element is provided by the invention. The first locking member is disposed on the shaft. The second locking member is disposed on the shaft. The third locking member is disposed on the shaft. The first locking member, the second locking member and the third locking member rotate with the shaft as an axis. The elastic element is sleeved on the shaft. A first side edge of the elastic element leans against the second locking member, and a second side edge of the elastic element leans against the third locking member to provide an elastic force between the second locking member and the third locking member, thereby maintaining or restoring a pivoting angle of the second locking member and the third locking member with respect to the axis.

In an embodiment of the invention, the first locking member is located below the shaft, the third locking member is located above the shaft, the second locking member is located at an end of the shaft, and the third locking member is located between the first locking member and the second locking member.

In an embodiment of the invention, the elastic element is a torsion spring.

An electronic device including a base, a docket station, a back plate and a hinge structure is provided by the invention. The docket station is pivoted to the base, and the back plate is pivoted to the docket station. The hinge structure includes a shaft, a first locking member, a second locking member, a third locking member and an elastic element. The first locking member is disposed on the shaft and locked on the base. The second locking member is disposed on the shaft and locked on the docket station. The third locking member is disposed on the shaft and locked on the back plate. The first locking member, the second locking member and the third locking member rotate with the shaft as an axis. The elastic element is sleeved on the shaft. A first side edge of the elastic element leans against the second locking member, and a second side edge of the elastic element leans against the third locking member to provide an elastic force between the second locking member and the third locking member thereby maintaining or restoring a pivoting angle of the second locking member and the third locking member with respect to the axis.

In an embodiment of the invention, the first locking member is located below the shaft, the third locking member is located above the shaft, the second locking member is located at an end of the shaft, and the third locking member is located between the first locking member and the second locking member.

In an embodiment of the invention, the elastic element is a torsion spring.

In an embodiment of the invention, the docket station rotate relative to the shaft through the second locking member of the hinge structure, so as to expand or close relative to the base.

In an embodiment of the invention, the back plate has an included angle with the docket station through the elastic force of the elastic element of the hinge structure.

In an embodiment of the invention, the angle ranges from 0 degree to 45 degrees.

In an embodiment of the invention, the electronic device includes a plurality of fastening members, and the first locking member, the second locking member and the third locking member are respectively locked on the base, the docket station and the back plate through the fastening members.

Based on the above, as the hinge structure of the embodiment can be simultaneously locked on the base, the docket station and the back plate, in comparison with the related art where the base, the docket station and the back plate can be locked together through two hinges, the invention can achieve reduction of the internal space of the electronic device, such that the thickness of the electronic device can be thinned, while the original structural strength of the electronic device can still be maintained.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
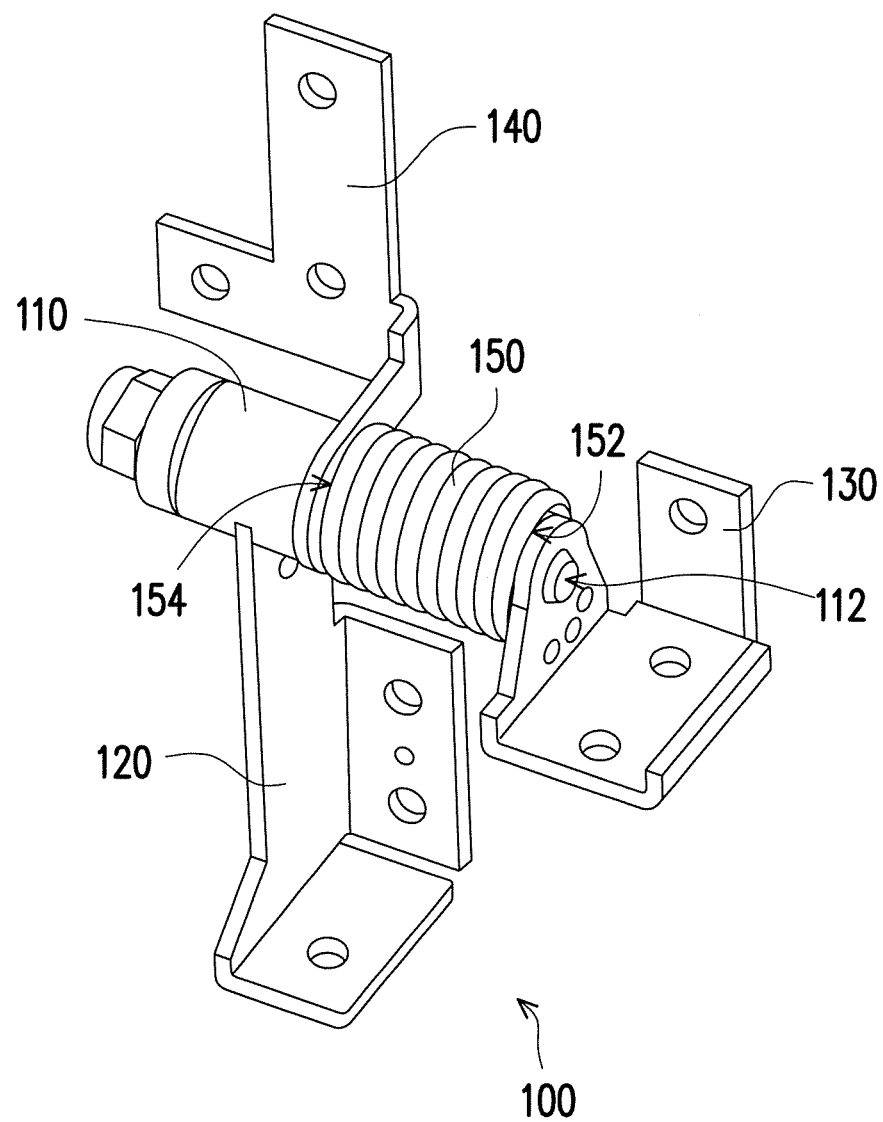
FIG. 1 is a schematic diagram illustrating a hinge structure according to an embodiment of the invention.

FIG. 1 is a schematic diagram illustrating a hinge structure according to an embodiment of the invention. Referring to FIG. 1, a hinge structure 100 of the present embodiment includes a shaft 110, a first locking member 120, a second locking member 130, a third locking member 140 and an elastic element 150. The first locking member 120, the second locking member 130 and the third locking member 140 are all disposed on the shaft 110. The first locking member 120, the second locking member 130 and the third locking member 140 rotate with the shaft 110 as an axis. The elastic element 150 is sleeved on the shaft 110. A first side edge 152 of the elastic element 150 leans against the second locking member 130, and a second side edge 154 of the elastic element 150 leans against the third locking member 140 to provide an elastic force between the second locking member 130 and the third locking member 140, thereby maintaining or restoring a pivoting angle of the second locking member 130 and the third locking member 140 with respect to the axis.

To be more specific, in the present embodiment, the first locking member 120 is located below the shaft 110, the third locking member 140 is located above the shaft 110, the second locking member 130 is located at an end 112 of the shaft 110, and the third locking member 140 is located between the first locking member 120 and the second locking member 130. The second locking member 130 may expand or close relative to the first locking member 120 through the shaft 110, and the third locking member 140 may expand or close relative to the second locking member 130 through the elastic element 150. In this case, the elastic element 150 is embodied as a torsion spring.

The hinge structure 100 of the present embodiment has three locking members, i.e., the first locking member 120, the second locking member 130 and the third locking member 140, thus can be simultaneously locked on three components, thereby reducing the number of hinges used in comparison with the related art.

It should be noted that, in the embodiment described below, element labels and portions of the previous embodiments are referenced hereafter, in which the same referral numerals are used to represent the same or similar elements. The descriptions of the same technical details are therefore not repeated here. The parts omitted from description may be referenced from the afore-described embodiments and are not repeated in the embodiment below.

Figure 2A:
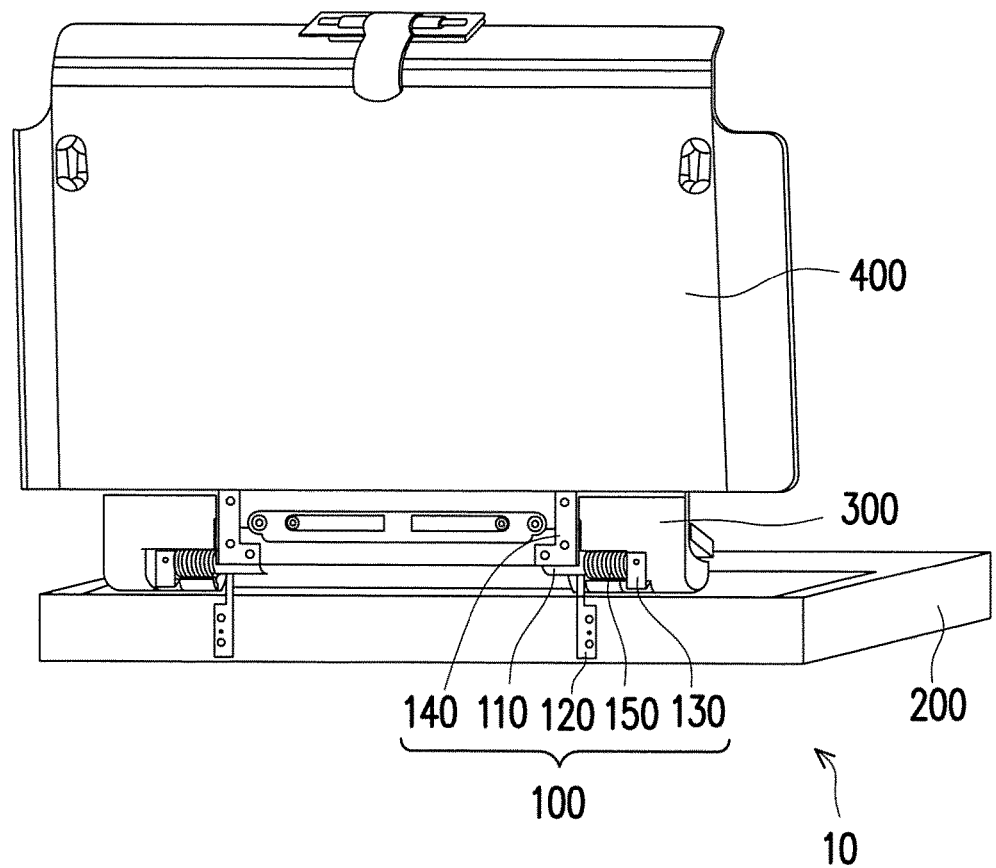
FIG. 2A is a schematic diagram illustrating an electronic device according to an embodiment of the invention.
Figure 2B:
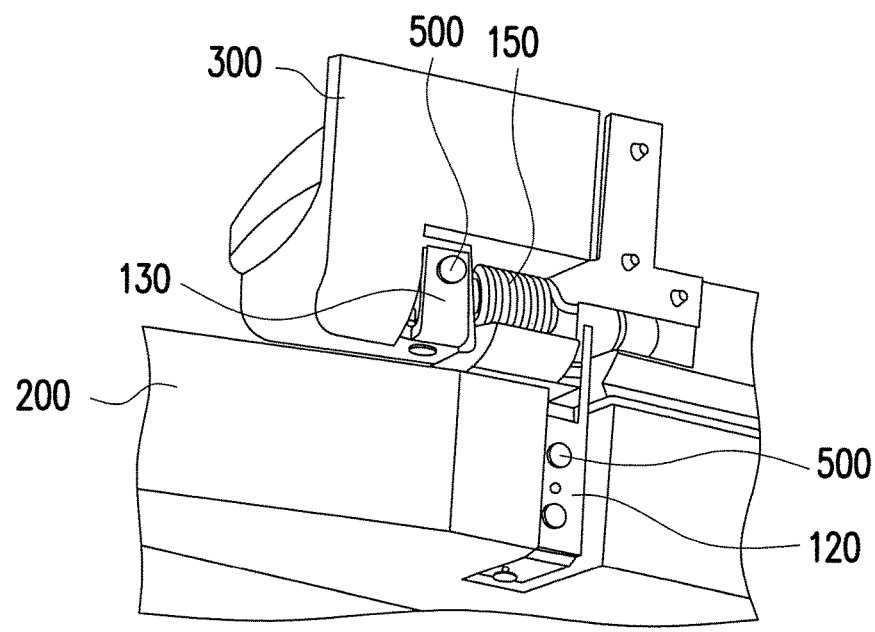
FIG. 2B and FIG. 2C are schematic partial enlarged diagrams illustrating the electronic device depicted in FIG. 2A.
Figure 2C:
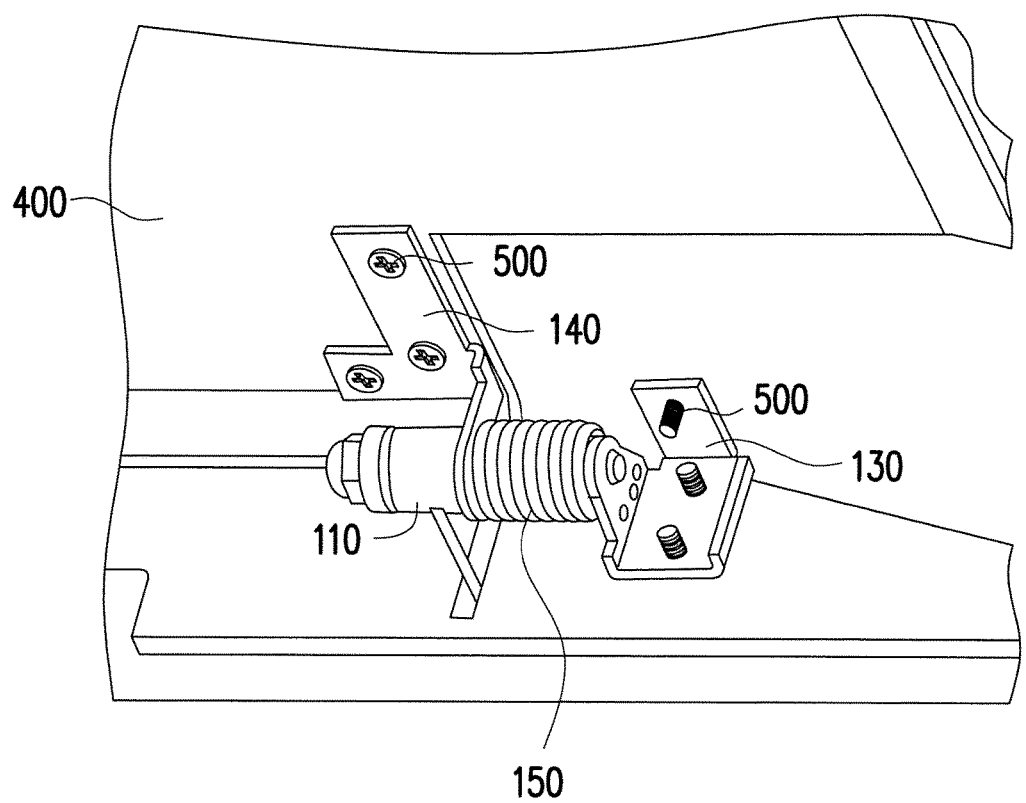
Figure 2D:
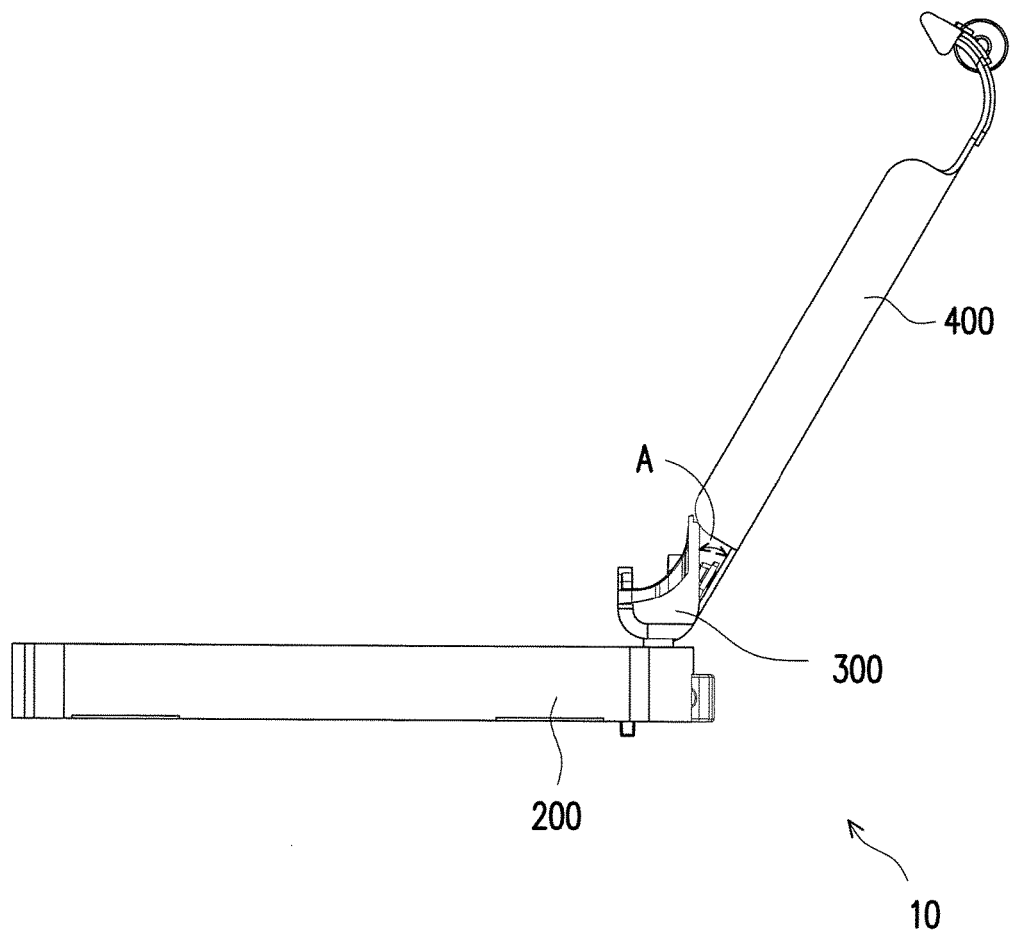
FIG. 2D is a schematic side-view diagram illustrating the electronic device depicted in FIG. 2A.

FIG. 2A is a schematic diagram illustrating an electronic device according to an embodiment of the invention. FIG. 2B and FIG. 2C are schematic partial enlarged diagrams illustrating the electronic device depicted in FIG. 2A. FIG. 2D is a schematic side-view diagram illustrating the electronic device depicted in FIG. 2A. Referring to FIG. 2A, 2B, FIG. 2C and FIG. 2D simultaneously, an electronic device 10 of the present embodiment includes the hinge structure 100, a base 200, a docket station 300 and a back plate 400. The docket station 300 is pivoted to the base 200, and the back plate 400 is pivoted to the docket station 300. The first locking member 120 of the hinge structure 100 is locked on the base 200, and the second locking member 130 of the hinge structure 100 is locked on the docket station 300, where the docket station 300 rotate relative to the shaft 110 through the second locking member 130 of the hinge structure 100, so as to expand or close relative to the base 200. Herein, a notebook computer is taken as an example for description, the base 200 is, for example, a host part of the notebook computer, on which an operation element is disposed, and the docket station 300 is suitable for a tablet computer (which is not shown) to be assembled thereto.

Additionally, in the present embodiment, the third locking member 140 of the hinge structure 100 is locked on the back plate 400, where the back plate 400 has an included angle A with the docket station 300 through the elastic force of the elastic element 150 of the hinge structure 100. In this case, the angle A ranges from 0 degree to 45 degrees, and the back plate 400 may serve as a protection cover of the tablet computer (not shown) assembled on the docket station 300. In other words, the back plate 400 of the present embodiment expands or closes by the angle A relative to the docket station 300 through the elastic force of the torsion spring.

Furthermore, referring to FIG. 2B and FIG. 2C again, the electronic device 10 of the present embodiment includes a plurality of fastening members 500. The first locking member 120, the second locking member 130 and the third locking member 140 are respectively locked on the base 200, the docket station 300 and the back plate 400 through the fastening members 500. In this case, the fastening members 500 are, for example, locks or bolts, which are not limited in the invention.

As the electronic device 10 of the present embodiment has the hinge structure 100 that can be simultaneously locked on the base 200, the docket station 300 and the back plate 400, in comparison with the related art where the base, the docket station and the back plate can be locked together through two hinges, the embodiment can achieve reduction of the internal space of the electronic device 10, such that the thickness of the electronic device 10, while the original structural strength can still be maintained.

In light of the foregoing, as the hinge structure of the invention can be simultaneously locked on the base, the docket station and the back plate, in comparison with the related art where the base, the docket station and the back plate can be locked together through two hinges, the invention can achieve reduction of the internal space of the electronic device, such that the thickness of the electronic device can be thinned, while the original structural strength of the electronic device can still be maintained.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A hinge structure, comprising: a shaft; a first locking member, disposed on the shaft and locked on a base; a second locking member, disposed on the shaft; a third locking member, disposed on the shaft, wherein the first locking member, the second locking member and the third locking member rotate with the shaft as an axis; and an elastic element, sleeved on the shaft, wherein a first side edge of the elastic element leans against the second locking member, and a second side edge of the elastic element leans against the third locking member to provide an elastic force between the second locking member and the third locking member, thereby maintaining or restoring a pivoting angle of the second locking member and the third locking member with respect to the axis wherein the first locking member is located below the shaft, the third locking member is located above the shaft while rotating, the second locking member is located at an end of the shaft, and the third locking member is located between the first locking member and the second locking member.

2. The hinge structure according to claim 1, wherein the elastic element is a torsion spring.

3. An electronic device, comprising: a base; a docket station, pivoted to the base; a back plate, pivoted to the docket station; and a hinge structure, comprising: a shaft; a first locking member, disposed on the shaft and locked on the base; a second locking member, disposed on the shaft and locked on the docket station; a third locking member, disposed on the shaft and locked on the back plate, wherein the first locking member, the second locking member and the third locking member rotate with the shaft as an axis; and an elastic element, sleeved on the shaft, wherein a first side edge of the elastic element leans against the second locking member, and a second side edge of the elastic element leans against the third locking member to provide an elastic force between the second locking member and the third locking member, thereby maintaining or restoring a pivoting angle of the second locking member and the third locking member with respect to the axis, wherein the first locking member is located below the shaft, the third locking member is located above the shaft while rotating, the second locking member is located at an end of the shaft, and the third locking member is located between the first locking member and the second locking member.

4. The electronic device according to claim 3, wherein the elastic element is a torsion spring.

5. The electronic device according to claim 3, wherein the docket station rotates relative to the shaft through the second locking member of the hinge structure, so as to expand or close relative to the base.

6. The electronic device according to claim 3, wherein the back plate has an included angle with the docket station through the elastic force of the elastic element of the hinge structure.

7. The electronic device according to claim 6, wherein the angle ranges from 0 degree to 45 degrees.

8. The electronic device according to claim 3, comprising:
a plurality of fastening members, wherein the first locking member, the second locking member and the third locking member are respectively locked on the base, the docket station and the back plate through the fastening members.

* * * * *